United States Patent
Groth et al.

(10) Patent No.: US 11,007,816 B2
(45) Date of Patent: May 18, 2021

(54) WHEEL OF A VEHICLE

(71) Applicant: Bayerische Motoren Werke Aktiengesellschaft, Munich (DE)

(72) Inventors: Kristian Groth, Munich (DE); Andreas Krause, Stockdorf (DE); Christopher Bourne, Hallbergmoos (DE); Peter Jaegermeyr, Wang (DE); Thomas Maier, Munich (DE); Julia Mieslinger, Landshut (DE); Mike Seidel, Schoeneck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 103 days.

(21) Appl. No.: 16/284,166

(22) Filed: Feb. 25, 2019

(65) Prior Publication Data
US 2019/0184736 A1    Jun. 20, 2019

Related U.S. Application Data

(63) Continuation of application No. PCT/EP2017/066737, filed on Jul. 5, 2017.

(30) Foreign Application Priority Data

Aug. 26, 2016    (DE) .................... 10 2016 216 067.2

(51) Int. Cl.
*B60B 7/10* (2006.01)
*B60B 7/08* (2006.01)
(Continued)

(52) U.S. Cl.
CPC ................. *B60B 7/10* (2013.01); *B60B 7/04* (2013.01); *B60B 7/061* (2013.01); *B60B 7/063* (2013.01);
(Continued)

(58) Field of Classification Search
CPC ..... B60B 7/008; B60B 7/0026; B60B 7/0033; B60B 7/0066; B60B 7/061; B60B 7/065;
(Continued)

(56) References Cited

U.S. PATENT DOCUMENTS 4,458,952 A * 7/1984 Foster .................... B60B 7/068
                                                   301/37.32
5,803,552 A * 9/1998 Kato ......................... B60B 7/02
                                                   301/37.34
(Continued)

FOREIGN PATENT DOCUMENTS

DE      10 2011 114 664 A1   4/2012
DE         102011114664 A1 * 4/2012  ............ B60B 7/063
(Continued)

OTHER PUBLICATIONS

International Search Report (PCT/ISA/210) issued in PCT Application No. PCT/EP2017/066737 dated Nov. 13, 2017 with English translation (six (6) pages).
(Continued)

*Primary Examiner* — Scott A Browne
(74) *Attorney, Agent, or Firm* — Crowell & Moring LLP

(57) ABSTRACT

A wheel of a vehicle, in particular a motor vehicle, has a rim, a hub portion, and at least two spokes connecting the hub portion to the rim. At least one free space between the spokes is covered at least in part by a substantially planar covering element. The covering element is produced from two different material layers.

16 Claims, 2 Drawing Sheets

(51) Int. Cl.
*B60B 7/04* (2006.01)
*B60B 7/06* (2006.01)

(52) U.S. Cl.
CPC .............. *B60B 7/065* (2013.01); *B60B 7/066* (2013.01); *B60B 7/08* (2013.01); *B60B 2310/204* (2013.01); *B60B 2310/306* (2013.01); *B60B 2360/10* (2013.01); *B60B 2360/30* (2013.01); *B60B 2360/32* (2013.01); *B60B 2360/368* (2013.01); *B60B 2900/111* (2013.01); *B60B 2900/311* (2013.01); *B60B 2900/513* (2013.01); *Y02T 10/86* (2013.01)

(58) Field of Classification Search
CPC .... B60B 7/10; B60B 7/08; B60B 7/04; B60B 7/063; B60B 7/066
See application file for complete search history.

(56) References Cited

U.S. PATENT DOCUMENTS

| | | | | |
|---|---|---|---|---|
| 6,517,168 B1* | 2/2003 | Van Houten | ............ | B60B 7/004 301/37.101 |
| 7,147,289 B2* | 12/2006 | Nakamura | ................ | B60B 7/08 301/37.28 |
| 7,510,248 B2* | 3/2009 | Wang | ........................ | B60B 7/10 301/37.102 |
| 8,201,894 B2* | 6/2012 | Chinavare | ................ | B60B 7/02 301/37.28 |
| 8,382,211 B2* | 2/2013 | Renius | ...................... | B60B 7/00 301/37.102 |
| 10,513,144 B2* | 12/2019 | Heck | ..................... | B60B 7/0086 |
| 2011/0291465 A1* | 12/2011 | Peschiutta | ................. | B60B 7/04 301/37.102 |
| 2013/0020856 A1 | 1/2013 | Dick et al. | | |
| 2013/0307321 A1* | 11/2013 | Mengle | ..................... | B60B 7/04 301/37.107 |
| 2015/0367677 A1 | 12/2015 | Pieronek et al. | | |
| 2016/0152069 A1* | 6/2016 | Pieronek | ................. | B60B 7/061 301/37.101 |

FOREIGN PATENT DOCUMENTS

DE  10 2011 079 599 A1  1/2013
DE  10 2013 101 421 A1  8/2014

OTHER PUBLICATIONS

German-language Written Opinion (PCT/ISA/237) issued in PCT Application No. PCT/EP2017/066737 dated Nov. 13, 2017 (six (6) pages).

* cited by examiner

WHEEL OF A VEHICLE

CROSS REFERENCE TO RELATED APPLICATIONS

This application is a continuation of PCT International Application No. PCT/EP2017/066737, filed Jul. 5, 2017, which claims priority under 35 U.S.C. § 119 from German Patent Application No. 10 2016 216 067.2, filed Aug. 26, 2016, the entire disclosures of which are herein expressly incorporated by reference.

BACKGROUND AND SUMMARY OF THE INVENTION

The invention relates to a wheel of a vehicle, in particular of a motor vehicle. With regard to the prior art, reference is made by way of example to DE 10 2011 079 599 A1.

A wide variety of demands are imposed on wheels of vehicles, in particular on those of passenger vehicles. In addition to sufficient strength at a low weight, the wheels are intended to be conducive for a good drag coefficient of the vehicle and to be distinguished by a pleasing optical appearance. The fact that the visible outer region of the wheels is soiled only to a low extent by the abrasion of the wheel brake provided on the inner side (i.e. the side facing the vehicle) of the wheels also matters in this respect. In order in particular to ensure this, it is known to cover the clearances between all of the spokes of a wheel in relation to the brake disk, which rotates together with the wheel, of the wheel brake by use of a single disk-shaped covering element which is provided on the inner side of the wheel. In addition, covering elements are also known which cover spoke intermediate spaces individually. One such covering element is disclosed, for example, in DE 10 2011 079 599 A1. In order to ensure sufficient strength, the covering element disclosed therein is formed by a fiber-reinforced plastic. The covering element is subsequently adhesively bonded to the wheel or to the spokes.

A disadvantage of this prior art is that, in order to avoid corrosion between the fiber-reinforced covering element and the wheel and to ensure a sufficiently firm connection between them, a time-consuming adhesive bonding process is necessary, which makes the installation process significantly more difficult. Furthermore, the subsequent removal or exchange of a covering element is possible only with difficulty in the case of an adhesively bonded design. However, it is difficult to use a different joining method in the case of fiber-reinforced plastics, in particular in the case of the use of long fibers which serve to ensure the desired strength, without obstructing or destroying the fibers.

It is therefore the object of the invention to provide a wheel of a vehicle with a covering element, which, in addition to optimum air cooling, high strength and low weight, ensures simple installation and removal.

The object is achieved by a wheel of a vehicle in accordance with embodiments of the invention.

A wheel of a vehicle, in particular of a motor vehicle, is provided, which, in addition to a rim for the support of a tire, and a hub portion for the installation of the wheel on the vehicle, comprises at least two spokes connecting the hub portion to the rim. The spoke intermediate space or the clearance between the spokes is at least partially covered here by a predominantly flat covering element. According to the invention, the covering element here is produced from two different material layers.

In order to ensure sufficient cooling of the wheel brake, the spoke intermediate space or the clearance between the spokes is preferably only partially covered by the covering element. The clearance mentioned, together with the customary geometry of a wheel of a vehicle, preferably describes a wedge-shaped or triangular clearance. Accordingly, the covering element is likewise preferably wedge-shaped or in the form of an annular portion.

A predominantly flat covering element is understood within the context of the invention as meaning an element which is flat in its entirety, but which nevertheless may have a small elevation or unevennesses in its geometrical configuration.

The use of a covering element which is produced from two different material layers makes it possible to use the advantages of various materials and therefore to provide a covering element optimally corresponding to the requirements.

It is thus provided, in a preferred embodiment of the invention, that the covering element comprises a metal layer, and a plastics layer which is produced in an insert molding process and is joined therewith to the metal layer. In the installed state of the covering element between the spokes of the wheel, the metal layer can then preferably be arranged on the wheel on the outer side, i.e. on the side facing away from the vehicle, and the plastics layer can be arranged on the wheel or on the spokes on the inner side, i.e. on the side facing the vehicle.

Depending on the material, the metal layer therefore meets the necessary strength demands imposed on the covering element, while the plastics layer provides additional support and is simple to manufacture, for example, in an insert molding process and to join to the metal layer in the same process step.

The necessary low weight of the covering element can be ensured by use of a relatively thin metal layer in comparison to the plastics layer. Particularly preferably, the metal layer thickness is of an order of size of 0.3 mm and 0.5 mm and the plastics layer thickness of an order of size of 2.5 and 4 mm.

Owing to the fact that the metal layer has the necessary strength properties, the plastic does not absolutely have to be reinforced by way of fibers, and therefore the plastic is significantly more flexible in respect of the joining methods to be used than the embodiment, known from the prior art, of a fiber-reinforced covering element. Furthermore, the metal layer which is oriented outward (i.e. facing away from the vehicle) in the installed state of the covering element serves for stone chip protection.

As already mentioned, the plastics layer is attached here to the metal layer in an insert molding process, wherein, as a positive additional effect, the raw edge between metal and plastic can be protected against corrosion and infiltration of the surface thereof by means of rust or corrosion, or the like can be avoided.

In a further embodiment of the invention, the covering element is held in a force-fitting manner on the wheel by way of a spring ring extending over the circumference on that side of the spokes which faces the vehicle. The spring ring itself is connected here to the covering element in a form-fitting manner. This form-fitting connection is preferably realized by catching or hooking of the spring ring into a groove, which is produced in the insert molding process, in the plastics layer. The spring ring therefore, as it were, pretensions the covering elements in the radial direction and also fixes same in the axial direction, wherein the covering elements can be held in the spoke intermediate spaces. A single spring ring which extends once over the circumference of the wheel and is connected here in a form-fitting manner to all of the covering elements which are present is sufficient for this purpose.

In a further preferred embodiment of the technology according to the invention, the covering element (with or without a previously explained spring ring) is held in a form-fitting manner on the spokes, on the rim and/or on the hub portion.

The covering element can be held here on the spokes, on the rim and/or on the hub portion, for example by use of a clip connection. The covering element here is particularly preferably held between two adjacent spokes by a clip connection on the inner spoke edges or the spoke edges facing the vehicle.

The clip connection mentioned above is preferably not a component which is to be arranged separately, but rather can constitute, for example, part of the plastics layer which is produced in an insert molding process and is joined to the metal layer. This is because the insert molding process mentioned, as a special form of an injection molding process, permits a high degree of freedom of shape with simultaneously simple manufacturing.

A clip connection of this type preferably comprises at least two fastening clips which, for their part, are arranged on that side which faces the vehicle (i.e. the side with which the plastics layer is also aligned), as viewed in the installed state of the covering element. As already mentioned above, the fastening clips can be produced in the insert molding process as a common component with the plastics layer or with the covering element.

The fastening clips particularly preferably hook into the respective inner edge of the adjacent spokes, for example when the covering elements are pressed down from the outside, thus resulting in the form-fitting connection mentioned.

In a further preferred refinement of the invention, the fastening clips comprise a fastening leg which is oriented at least approximately in the axial direction of the wheel in a manner protruding from the flat covering element (preferably from the plastics layer) and at least approximately in the direction of the bisector or line of symmetry of the (wedge-shaped) spoke intermediate space running in the radial direction of the wheel. At the free end of said fastening leg, a latching lug is preferably arranged in a manner protruding at a certain angle from said fastening leg and latches or hooks in at an edge, which faces the vehicle, of the respective spoke.

Since the fastening leg is oriented in the direction of the bisector or the line of symmetry and not in the radial direction of the wedge-shaped spoke edges, the latching lug is prestressed radially in the direction of the outer circumference of the wheel or pressed in the direction of the rim during the hooking-in or latching with or into the inner edge of the respective spoke. The prestressing produced in the process (radially outward) of the covering element prevents the covering element from slipping or sliding out within the (wedge-shaped or triangular) spoke intermediate space or within the clearance. The covering element is preferably adjacent here to the "adhesive weight surface", to which balancing weights are customarily attached.

In order to ensure a firm seat of the clip connection and to make the pulling-off forces thereof sufficiently high, it is provided, in a further preferred embodiment of the invention, that the fastening clips are additionally prestressed in the circumferential direction of the wheel by a spring element.

For this purpose, for example, use can be made of a spring clip which is supported either between the two fastening clips (symmetrically opposite to one another in relation to the bisector) or in each case on one fastening clip, and therefore the fastening clip and in particular the latching lug therefor are pressed or stressed more firmly against the spoke edges in the circumferential direction. The spring element here can be designed both as an element to be attached separately or else as part of the covering element. In the case of a separately attached spring clip, the covering element can then be pressed from the side facing away from the vehicle into the spoke intermediate space, while the spring clips can then be attached to the covering element from the other side (i.e. the side facing the vehicle).

In a next preferred embodiment of the invention, there is at least one orientation rib which protrudes axially from the flat covering element on the side facing the vehicle and ensures a distance between the edges of the flat covering element and wheel components adjacent thereto. Orientation ribs of this type, like also the clip connection, can be jointly produced in the insert molding process of the plastics layer and therefore constitute part of the plastics layer. They are positioned on the covering element (preferably on that side of the covering element which is oriented inward) in such a manner that a gap always prevails between the edges of the flat covering element and the wheel components which are adjacent to or border the latter, such as, for example, the spokes, the rim, the rim flange region and/or the adhesive weight surface.

By means of orientation ribs of this type and the gap which they cause around the covering element, a permanent water drain through the gap can be ensured.

Furthermore, it is preferred that the covering element comprises at least one contact rib which supports the covering element on the wheel and is arranged in a manner protruding axially from the flat covering element on the side facing the vehicle. Such a contact rib can also constitute a part, which is produced in the insert molding process, of the plastics layer which exerts an additional holding function by support against bordering wheel components. For example, such a contact rib can be supported on the adhesive weight surface of the wheel and can thereby avoid the covering element springing out in the radial direction. Furthermore, yet further contact ribs can be arranged on the covering element.

Since it is possible for the covering element to block or cover access (from the outside) to the air inlet valve or air outlet valve of the wheel or of the tire, in a preferred embodiment of the invention an opening is provided in the covering element. The opening then permits the required access from the outside (i.e. that side of the wheel which faces away from the vehicle).

Alternatively or additionally thereto, access to the air inlet valve or air outlet valve can also be made possible by simple release of the clip connection and removal of the covering element. Furthermore, the simple releasability of the covering element generally permits unproblematic exchange of covering elements should such an exchange be necessary, for example due to damage or for cleaning purposes.

By means of the different embodiments (together, combined or else independently of one another), the invention disclosed here makes a wheel possible which is optimized in respect of the aerodynamics and can be installed/removed in a simple manner and also meets the strength and weight requirements.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
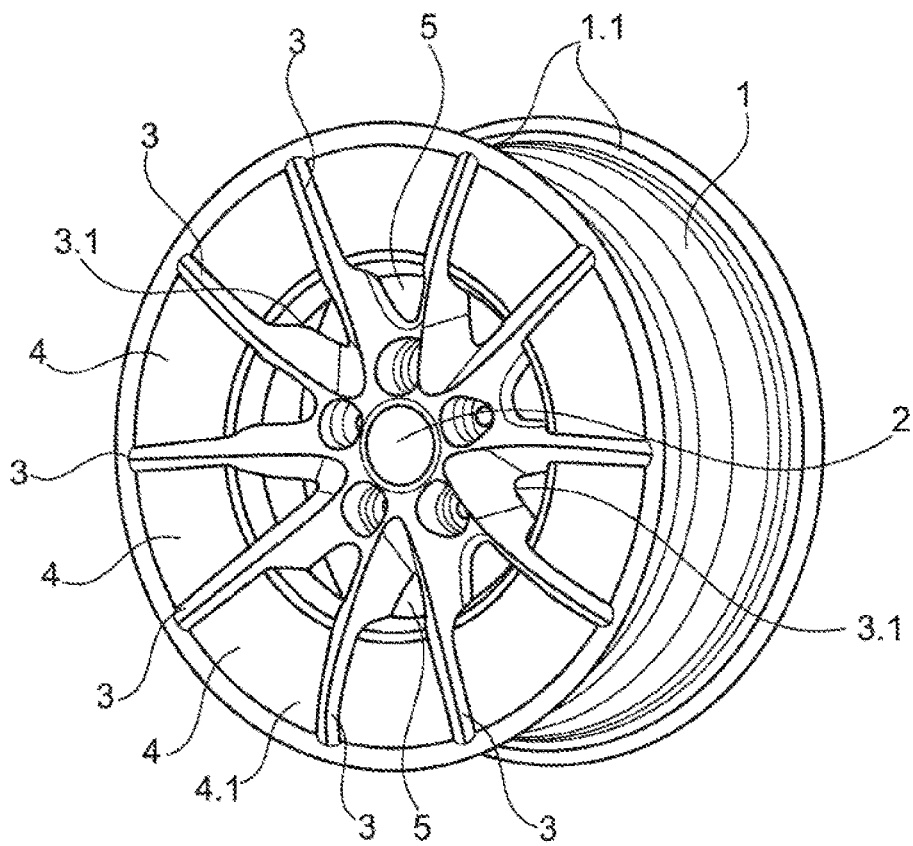
FIG. 1 shows a wheel of a vehicle with a multiplicity of covering elements which are each formed in an identical manner.

FIG. 1 shows a wheel of a vehicle which, in addition to a rim 1 and a hub portion 2, comprises a plurality of spokes 3 connecting them. A clearance or spoke intermediate space 5 which, in this example, is partially covered by a flat covering element 4 is located here between each of the spokes 3. The covering element 4 is composed of two different material layers, namely of an outer metal layer 4.1 (as viewed in the installed state and in the state depicted in FIG. 1), and also a plastics layer 4.2, which faces the vehicle, i.e. is virtually aligned with the wheel interior and which cannot be seen in FIG. 1. The covering element 4 here does not completely cover the spoke intermediate space 5 in order to ensure air cooling of the wheel brake (not depicted). In this specific case, because of aerodynamic advantages, the covering element 4 is adjacent to the two spokes and also to the rim flange 1.1 or to the adhesive weight surface 6 of the wheel.

Figure 2:
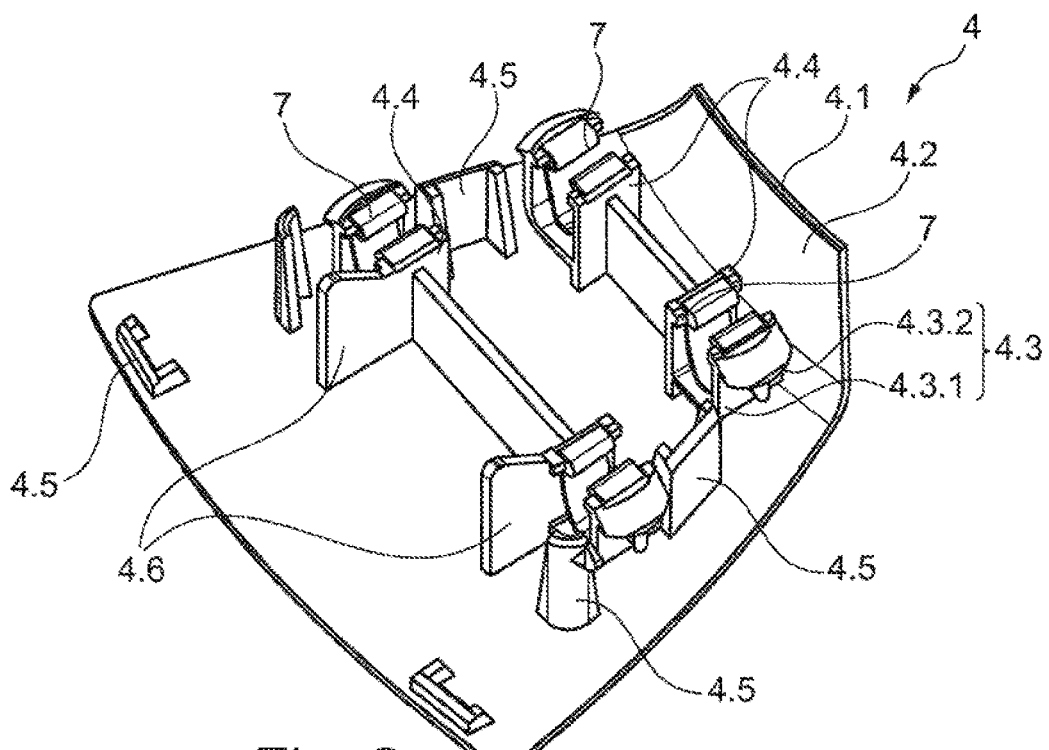
FIG. 2 shows one of the covering elements from FIG. 1 in a three-dimensional detailed view.

FIG. 2 shows the flat covering element 4 in a non-installed state and this time virtually from the other side, i.e. the side at which the plastics layer 4.2 mentioned is depicted and which faces the vehicle in the installed state (FIG. 1). The plastics layer 4.2 has been joined or attached here to the metal layer 4.1 in an insert molding process and therefore the flat covering element 4 has been produced. In the same insert molding process, the fastening clips 4.3, which are required for fastening the covering element to the spokes 3, and further elements or ribs which protrude from the flat plastics layer 4.2 and which will be discussed in greater detail below are also produced.

Figure 3:
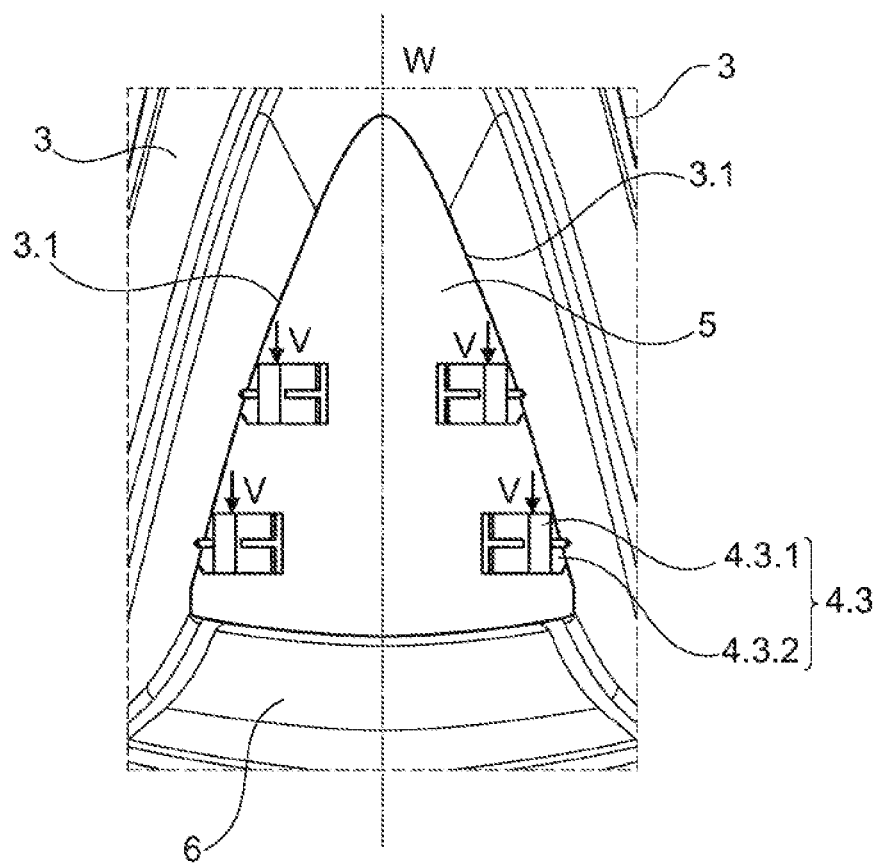
FIG. 3 shows a spoke intermediate space of the wheel from FIG. 1 in a detailed view in which only one clip connection (without a flat covering element) is depicted.

In this case, the covering element is latched or clipped onto the respective inner edge 3.1 of each spoke 3 (i.e. the edge facing the vehicle) by means of four (identically designed) fastening clips 4.3 and therefore held. Each fastening clip 4.3 here comprises a fastening leg 4.3.1 which, as viewed in the installed state (FIG. 1) of the covering element 4, is oriented in a manner at least approximately protruding from the flat covering element 4 in the axial direction of the wheel and at least approximately in the direction of the bisector W of the spoke intermediate space 5. In addition to the fastening leg 4.3.1, the fastening clip 4.3 also comprises a latching lug 4.3.2 which is arranged at the free end of the fastening leg 4.3.1 and serves for latching in or catching with the inner spoke edges 3.1. The orientation of the fastening leg 4.3.1 always points in the direction of the bisector W of a spoke intermediate space 5 irrespective of the shape or geometry of the flat covering element 4. To clarify this matter, the four (identically designed) fastening clips 4.3 are depicted in the installed state of the covering element 4 without the flat material layers in FIG. 3. The parallelism (at least virtual parallelism) of the orientation of the fastening leg 4.3.1 to the bisector W of the wedge-shaped or triangular spoke intermediate space 5 can be seen here. There does not necessarily have to be exact parallelism between the bisector W and the orientation of the fastening leg 4.3.1. However, it is important that the orientation of the fastening leg 4.3.1 is at least approximate to that of the bisector W. This is because, by means of the different orientation of the spoke edge 3.1, which runs in the radial direction of the wheel and of the fastening leg 4.3.1, which in this case runs in the direction of the bisector W, in the clipped-in state of the covering element 4, prestressing V of the latter is produced radially in the direction of the outer circumference of the wheel or in the direction of the adhesive weight surface 6 of the wheel. The prestressing V produced here of the covering element 4 prevents the latter from slipping or slipping out within the wedge-shaped or triangular spoke intermediate space 5.

In order to ensure an optimal firm seat and the required pulling-off forces of the connection, the fastening clips 4.3 are additionally held by one spring clip 7 each, which is shown in FIG. 2. A separately arranged spring clip 7 is in each case supported here on the fastening clip 4.3 and on a further supporting element 4.4 protruding axially from the flat plastics layer 4.2 (in the installed state).

In addition to the fastening clips 4.3 and the supporting elements 4.4 which have been mentioned, further elements protruding axially from the flat plastics layer 4.2 (in the installed state) are also shown in FIG. 2. All of these elements have been produced in the same production process, namely the insert molding process with the plastics layer 4.3, and therefore they constitute a joint component with the flat material layers, namely the covering element 4. For example, "orientation ribs" 4.5 on the covering element on the side of the plastics layer 4.2 (in the installed state) can be seen protruding axially from the covering element 4. The orientation ribs are for ensuring a gap or distance between the edges of the flat covering element 4 and the other wheel components adjacent thereto, such as, in this case, for example, the adhesive weight surface 6 and the spokes 3. Such a gap ensures a permanent water outflow through the covering elements 4 and therefore prevents an accumulation of water or dirt possibly damaging the wheel.

In addition, two contact ribs 4.6 making contact with the adhesive weight surface 6 (in the installed state of the covering element 4) are also arranged in a manner protruding axially from the flat covering element 4. Such contact ribs 4.6 ensure an additional holding function of the covering element 4 within the installed position. In this case, the contact ribs 4.6 assist in preventing the covering element from springing out in the radial direction.

| List of reference signs: | |
|---|---|
| 1 | Rim |
| 2 | Hub portion |
| 3 | Spoke |
| 3.1 | Inner spoke edge |
| 4 | Covering element |
| 4.1 | Metal layer |
| 4.2 | Plastics layer |
| 4.3 | Fastening clips |
| 4.3.1 | Fastening leg |
| 4.3.2 | Latching lug |
| 4.4 | Supporting element |
| 4.5 | Orientation rib |
| 4.6 | Contact rib |
| 5 | Spoke intermediate space |
| 6 | Adhesive weight surface |

-continued

List of reference signs:

| | |
|---|---|
| 7 | Spring clip |
| W | Bisector |
| V | Prestressing |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel of a vehicle, comprising:
a rim;
a hub portion;
at least two consecutive spokes connecting the hub portion to the rim;
a first and second latching lug;
a spring element configured to provide a force in a circumferential direction of the wheel; and
a predominantly flat covering element which at least partially covers at least one spoke intermediate space between the at least two consecutive spokes, wherein
the covering element is held on to the at least two consecutive spokes by the first and second latching lugs,
at least one of the first or second latching lugs are deflected by the spring element in a direction opposing the other latching lug, and
at least one of the first or second latching lugs are disposed circumferentially within radial edges of the covering element.

2. The wheel as claimed in claim 1, wherein
the covering element comprises a metal layer, and a plastics layer which is produced in an insert molding process and is joined therewith to the metal layer.

3. The wheel as claimed in claim 1, wherein
the covering element is held in a force-fitting manner on the wheel via a spring ring extending over the circumference on that side of the spokes which faces the vehicle, and
the spring ring itself is connected in a form-fitting manner to the covering element.

4. The wheel as claimed in claim 1, wherein
the covering element is held in a form-fitting manner on the spokes, on the rim and/or on the hub portion.

5. The wheel as claimed in claim 2, wherein
the covering element is further held on the rim and/or on the hub portion by a clip connection.

6. The wheel as claimed in claim 5, wherein
the clip connection comprises at least two fastening clips which, for their part, are arranged on the side facing the vehicle, as viewed in the installed state of the covering element, and are part of the plastics layer produced in the insert molding process.

7. The wheel as claimed in claim 6, wherein
the fastening clips each comprise at least one fastening leg which is oriented at least approximately in the axial direction of the wheel in a manner protruding from the flat covering element and at least approximately in the direction of the bisector or the line of symmetry of the spoke intermediate space and on which the first or second latching lug for latching in at an edge, which faces the vehicle, of the respective spoke is arranged.

8. The wheel as claimed in claim 5, wherein
at least one orientation rib protrudes axially from the flat covering element on the side facing the vehicle and ensures a distance between the edges of the flat covering element and components adjacent thereto.

9. The wheel as claimed in claim 5, wherein
at least one contact rib which supports the covering element on the wheel is arranged axially from the flat covering element on the side thereof which faces the vehicle.

10. The wheel as claimed in claim 1, wherein
the covering element comprises an opening which ensures access to an air valve of a tire.

11. The wheel as claimed in claim 1, wherein
at least one orientation rib protrudes axially from the flat covering element on the side facing the vehicle and ensures a distance between the edges of the flat covering element and components adjacent thereto.

12. The wheel as claimed in claim 1, wherein
at least one orientation rib protrudes axially from the flat covering element on the side facing the vehicle and ensures a distance between the edges of the flat covering element and components adjacent thereto.

13. The wheel as claimed in claim 1, wherein
at least one contact rib which supports the covering element on the wheel is arranged axially from the flat covering element on the side thereof which faces the vehicle.

14. The wheel as claimed in claim 8, wherein
at least one contact rib which supports the covering element on the wheel is arranged axially from the flat covering element on the side thereof which faces the vehicle.

15. The wheel as claimed in claim 14, wherein
the covering element comprises an opening which ensures access to an air valve of a tire.

16. A wheel of a vehicle, comprising:
a rim;
a hub portion;
at least two consecutive spokes connecting the hub portion to the rim;
a spring ring;
a spring element;
a first and second fastening clip; and
a predominantly flat covering element which at least partially covers at least one spoke intermediate space between the at least two consecutive spokes, wherein
the covering element is held in a force-fitting manner on the wheel via the first and second fastening clips and the spring ring extending over the circumference on that side of the at least two consecutive spokes which faces the vehicle,
the spring ring itself is connected in a form-fitting manner to the covering element,
at least one of the first or second fastening clips is additionally prestressed in a circumferential direction of the wheel opposing the other fastening clip by the spring element, and
at least one of the first or second fastening clips are disposed circumferentially within radial edges of the covering element.

* * * * *